United States Patent
Eriksson et al.

[11] Patent Number: 6,125,544
[45] Date of Patent: Oct. 3, 2000

[54] PRUNING SAW

[75] Inventors: Eckhard Eriksson, Obernau, Switzerland; Nils-Erik Lund, Bolinäs, Sweden

[73] Assignee: Sandvik Aktiebolag, Sandviken, Sweden

[21] Appl. No.: 09/174,098

[22] Filed: Oct. 16, 1998

[30] Foreign Application Priority Data

Oct. 17, 1997 [SE] Sweden .................................. 9703788

[51] Int. Cl.⁷ .................................................. B27B 33/10
[52] U.S. Cl. .............................. 30/166.3; 30/517; 83/835
[58] Field of Search .................... 30/166.3, 514, 30/517, 355, 357; 83/835

[56] References Cited

U.S. PATENT DOCUMENTS

| | | | |
|---|---|---|---|
| 378,203 | 2/1888 | Lohman | 83/835 |
| 698,764 | 4/1902 | Tyler | 30/166.3 |
| 1,919,748 | 7/1933 | Roberts | 30/166.3 |
| 2,916,066 | 12/1959 | Morse | 30/166.3 |
| 4,603,613 | 8/1986 | Wilson | 83/835 |
| 4,627,165 | 12/1986 | Gibson | 30/166.3 |
| 5,603,252 | 2/1997 | Hayden, Sr. | 83/835 |

*Primary Examiner*—Hwei-Siu Payer
*Attorney, Agent, or Firm*—Burns, Doane, Swecker & Mathis, L.L.P.

[57] ABSTRACT

A pruning saw includes an elongated sawblade which has a line of cutting teeth. Opposite sides of the blade extending between the line of teeth and the back edge are concave. A thinnest waist between the concave sides is located closer to the line of teeth than to the back where the blade has its maximum height. A front edge of the blade forms a rounded corner where it intersects the back edge.

11 Claims, 2 Drawing Sheets

PRUNING SAW

FIELD OF APPLICATION OF THE INVENTION

This invention concerns a pruning saw of the kind comprising an elongated saw blade, which is connected at one end to a handle and which has along its whole length a uniform line of teeth with homologous and equidistantly located teeth, where both faces of the blade between the line of teeth and an opposing back edge have a slightly concave shape and where an individual tooth has front and rear cutting edges formed by the intersection of a flat face with two obliquely ground surfaces, each of which extends at an angle to the faces, and where an individual gullet between two teeth is rounded and extends at right angle to the plane of the faces.

BACKGROUND OF THE INVENTION

Handsaws of the type called pruning saws by craftsmen are used not only for non-professional gardening but also professionally such as for pruning of growing plants in vineyards, large fruit orchards or similar. Lately, the increasing use for such purposes has led to stringent requirements for such saws which are frequently used under various circumstances. To fill the operators' requirements in easy as well as difficult circumstances, the saw should have a number of optimized properties. One of these is that the teeth should be efficient and allow fast cutting even of thick and tough branches, and yet at the same time leave the cut wood surface as smooth as possible to simplify fast healing of the tree. The saw blade should have sufficient clearance to avoid getting pinched in the cut kerf. Also, the chip removal and transport out from the kerf should be efficient, otherwise sawdust tends to get trapped in the border zone between the saw blade and the cut surfaces, thereby making the sawing more difficult. Further, the shape of the saw blade should allow easy access to individual branches even in a confined space. The ergonomic properties of the saw seen as a whole are also important. The saw blade and the handle should together form a harmonical unit, feeling well balanced in the hand, and able to transfer the muscular power of the operator to the saw blade and the sawn item in such a way that it is efficient and requires minimal energy. Not least important in this case is the geometric shape of the handle and its surface structure. The gripping part of the handle should thus form such an angle to the blade that the sawing will be efficient when pulling rearwards as well as when pushing forwards, at the same time allowing the operator to lastingly maintain a steady grip on the handle. Furthermore, the surface structure of the handle should have such a character that there is no tendency for the gripping part of the handle to rotate within the user's fist, while at the same time it will not cause superficial skin injury to the skin of the palm.

SUMMARY AND OBJECTS OF THE INVENTION

Pruning saws of the type mentioned above according to prior art do not fill the needs and requirements well enough. The present invention aims to create an improved pruning saw. One fundamental aim of the invention is thus to create a pruning saw which will ensure efficient chip removal from the kerf and permit fast and efficient sawing with minimal muscle power while producing smooth sawn kerf surfaces, at the same time avoiding getting squeezed in the kerf. Another aim is to create a pruning saw which is at least to some extent operative in each of two directions of force application, pulling rearwards and pushing forwards. Another aim is to create a pruning saw with optimal ergonomic design.

According to the invention, at least the fundamental aim is achieved by a pruning saw which comprises an elongated saw blade and a handle connected to a rear mounting portion of the blade. The blade includes a cutting portion projecting longitudinally forwardly from the handle. The cutting portion forms a toothed longitudinal edge and a longitudinal back edge situated opposite the toothed edge. A line of cutting teeth is disposed substantially entirely along the toothed edge. A cutting portion includes opposite side surfaces extending between the back edge and the toothed edge and forming side surfaces of the teeth. A distance between the back edge and the toothed edge defines a height of the blade. The teeth have rake faces ground therein in one of the side surfaces and intersecting the other side surface to form front and rear cutting edges on each tooth. The first and side surfaces of the blade are concavely curved whereby a thickness of the blade defined between the side surfaces varies from adjacent the toothed edge to adjacent the back edge. The narrowest thickness defines a waist of the blade. The waist is disposed closer to the toothed edge than to the back edge in a maximum-height region of the blade.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAIL DESCRIPTION OF THE PREFERRED EMBODIMENT OF THE INVENTION

Figure 1:
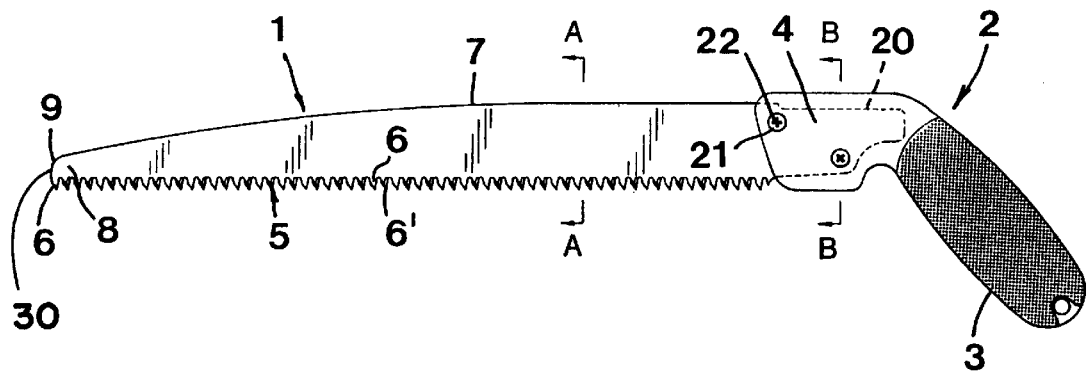
FIG. 1 is a side view of a saw according to the invention.
Figure 2:
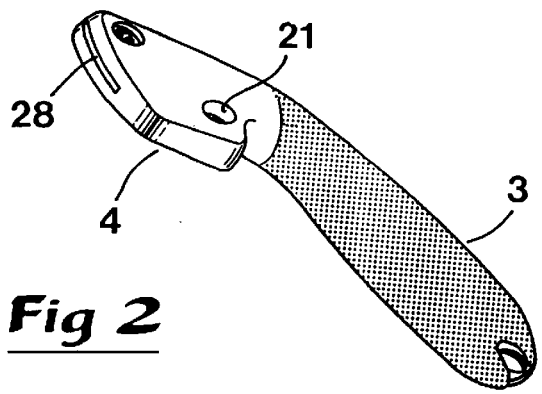
FIG. 2 is a perspective view showing only the handle of the saw.
Figure 3:
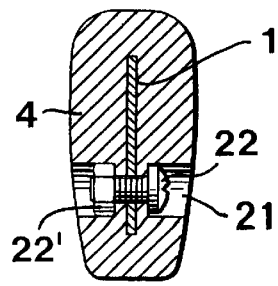
FIG. 3 is a slightly enlarged cross section taken along line B—B in FIG. 1, through an attachment part of the handle.

The pruning saw shown in FIG. 1 comprises an elongated blade (1) and a handle unit (2). This handle comprises a gripping part (3) and an attachment part (4) connected to a rear mounting portion of the saw blade. A cutting portion of the blade projects longitudinally forwardly from the handle and has a line of teeth (5), that forms a longitudinal toothed edge. The line of teeth comprises a multitude of teeth (6, 6') of equal shape. Preferably, the teeth should have equal size and equal distance for simplest manufacture. A back edge (7) of the blade is situated opposite to the line of teeth (5).

In the shown embodiment the back edge (7) extends straight and parallel to the line of teeth (5) from the handle to a point at a certain distance from the handle, the blade having a maximum height here. From here, the back edge (7) is somewhat curved, tapering down to near the free end front region. At the front end the back edge turns into a convexly rounded edge portion (9) which via a short straight front edge (30) directly turns into a front tooth (6). In other words, the saw does not have a front portion with sharp corners that are characteristic of conventional pruning saws, and which are likely to injure the bark of a tree when inserted between a trunk and a branch to be sawn off. The rounded edge portion (9) of the saw blade will reduce the risk of this type of bark injury. In addition, the line of teeth (5) will have a maximal length for a given blade length since the first (leading) tooth is actually part of the extreme front portion of the blade, while the rearmost (trailing) tooth is located in the immediate vicinity of the front end of the handle.

In contrast to conventional set teeth, the teeth (6, 6') are not set, but rather are produced through grinding operations from a flat blade blank as described in the following. Both opposite side faces (10, 10') of the blade are made with a slightly concave shape as shown in FIG. 4.

Figure 5:
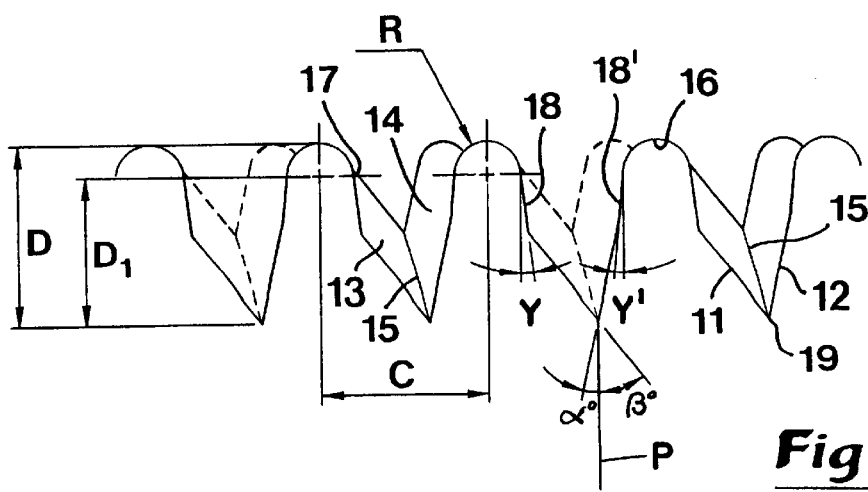
FIG. 5 is an enlarged detail drawing showing a number of individual teeth in the line of teeth of the saw.

Referring to FIG. 5, this shows the geometry of the individual teeth. Each tooth has front and rear edges (11, 12) created by the grinding of two rake surfaces (13, 14) in one of the side faces (10, 10'). Each rake surface forms an acute angle with the other side face, which other side forms an outer face of the tooth. The rake surfaces of each tooth intersect at a common ridge line (15). The side rake angle, measured as the angle between the rake surfaces (13, 14) and the outer face, should be in the range 40–50 degrees, preferably 42–48 degrees. The optimal value is 45 degrees. The angle of attack a for the rear edge (12), measured as the angle between the rear edge and a plane P normal to the blade (or to the longitudinal line of teeth) should according to the invention be in the range of 8–14 degrees. In the depicted preferred case this angle of attack $\alpha$ is 12 degrees. The corresponding angle of attack $\beta$ for the front edge (11) should be in the range 33–43 degrees, preferably 36–40degrees. In the shown preferred case the angle $\beta$ is 38 degrees. The bottom (16) of an individual gullet between two adjacent teeth is rounded with a radius R and extends at a right angle to the plane of the blade. It is preferably shaped as an almost semicylindrical surface, merging at one point (17) into a sloping surface (18) extending to the front edge (11). On the other side of the gullet is a corresponding front sloping surface (18'). As shown in FIG. 5 the rear sloping surface (18) has a slope y which in the preferred case is shown as 7 degrees. The corresponding front sloping surface (18') has a slope y' which in the preferred case is shown as 5 degrees.

Figure 4:
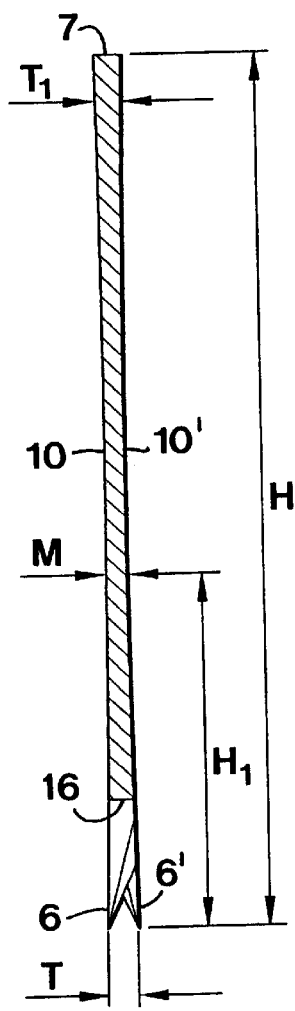
FIG. 4 is a greatly enlarged cross section taken along the line A—A through the saw blade of FIG. 1.

In the preferred case illustrated by the drawings, the rear portion of the saw blade has a maximum width or height H, shown in FIG. 4. The maximum height is about 42 mm, and a thickness of the blade varies slightly, but is on the order of 1 mm. The tooth height D measured from the gullet bottom (16) to the tip (19) of the tooth is shown as about 5 mm. The height D1 measured from the tooth tip to the center of the semicircle of the gullet bottom is about 4 mm. In other words, the gullet bottom (16) is formed by a cylindrical surface with a radius of 1.0 mm.

Referring to FIG. 5 it should be emphasized that the ridge line (15) should extend all the way to where the edges (11, 12) meet. This means that the tip (19) becomes pointed and extremely sharp. It should be noticed that the gullet between adjacent teeth, because of the semicylindrical volume delimited by the bottom surface (16), has a volume which is more than three times as large as the corresponding volume of conventional saw blades. This means that the gullets will be able to hold a volume of sawdust three times larger than conventional blades. As a result, the transport of sawdust out from the sawn kerf is greatly facilitated, and the tendency of the saw blade to get pinched in the kerf is radically reduced.

FIGS. 1 and 5 show that the teeth constitute left teeth (6) and right teeth (6') that alternate with one another. Every left tooth (6) has its outer (non-ground) surface on the left side surface (10) of the saw blade when it is viewed from the handle towards the front end (8), while the outer (non-ground) surface of a right tooth (6') is part of the right side surface (10') of the blade. No setting of the teeth is needed. The thickness T of the blade in the tooth tip region, shown in FIG. 4, is in the preferred case 1.26 mm. A corresponding thickness $T_1$ at the back is 1.06 mm. Although the teeth are part of these slightly concave sides, the outer surfaces of the teeth may be regarded as flat. Between the back edge (7) and the tooth line (5) the blade has a thin waist (M) where the thickness is least, in the preferred case M is 0.84 mm thick. A characteristic of the sawblade according to the invention is that this waist is located closer to the tooth line than to the back edge, at least in the rear half of the blade where the back edge (7) has its maximal height. Preferably, the distance between the back edge (7) and the waist M should be at least 1.3 times the distance between the waist M and the tooth line (5). In the actual case the distance H1 between the waist M and the tooth line (5) is 1.7 mm when the height H is 42 mm. That means that the concave curvature is more pronounced below the waist than above.

On earlier known concavely ground saw blades the waist has been located approximately midway between the back edge and the tooth line. This has made the vertical clearance angle of the teeth non-optimal. By locating the waist according to the invention noticeably closer to the tooth line, the concave shape will be more pronounced in the vicinity of the tooth line, increasing the clearance, while retaining an appropriate stiffness of the back edge.

Used as blanks for the production of saw blades according to the invention, are strips of steel with initially rectangular cross section, where both opposing sides are flat and parallel. For saw blades with the actual height of 42mm and maximum thickness of 1.26 mm, bands with a thickness of 1.5 mm could be used. Initially the rake faces (13, 14) are produced by grinding in two steps. In a third step, the gullets between adjacent teeth are ground. This is done with a grinding tool giving a generally semicylindrical narrow bottom extending normal to the plane of the blade. The center-to-center distance C between these gullets is in the illustrated case 5 mm, thus making the pitch distance between tooth tips 5 mm. The grinding operations can be done on a multitude of blanks clamped as a packet side by side. In a fourth, step the sawblade is given the desired contour by blanking or shearing. The rearmost toothless portion (20) shown in FIG. 1 is then given a partially tapering shape suited for insertion in a slot 28 of the handle. In this portion are also two holes (21) to receive fasteners (22) such as screws and nuts 221. As shown in FIG. 1 these holes are diagonally offset. This maximizes the distance between the fasteners within the restricted space of the fastening part of the handle, to minimize the force on each fastener.

In a last step, the side surfaces of the blades are ground to produce a concave shape with a very large radius of curvature, where the grinding tools are applied in such a way that the thinnest section after grinding, called the waist (M), is localized closer to the tooth line (5) than to the back edge (7) as described above.

Advantages with the Pruning Saw According to the Invention

Compared to conventional pruning saws, the saw according to the invention has a number of advantages. Because of the geometry of the blade and its teeth, as described in FIGS. 4 and 5, the saw will operate efficiently and fast. Because of the tooth edge angles proposed, the teeth will cut aggressively, which is further accentuated by the extremely sharp and pointed tooth tips, at the same time that the spacious and rounded gullets will ensure a good chip transport. The efficient chip transport will ensure that the saw will travel easily while cutting, with no tendency to get pinched in the kerf. The deep gullets make it easy to resharpen the saw by hand filing.

The teeth are not set but formed only by grinding, while retaining the outside faces flat and smooth, which serves to create extremely even and smooth cut surfaces. This helps the healing of the cut object after trimming. Since the thin waist of the saw blade is located relatively close to the tooth line, the clearance along the tooth line will also be very advantageous, with the risk of pinching of the blade in the kerf reduced to a minimum.

Through the narrowly elongated form of the saw blade, characterized by a roundedly tapering outer end and a softly rounded front contour at the free end, it is ensured that the saw can be neatly manipulated in narrowly confined spaces, at the same time limiting damage to the bark. Having the tooth line extend along the whole length of the blade, the first tooth in immediate vicinity of the free front end of the blade and the rearmost tooth in immediate vicinity of the handle, noticeably enhances the sawing efficiency.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A pruning saw comprising an elongated saw blade and a handle connected to a rear mounting portion of the blade; the blade including a cutting portion projecting longitudinally forwardly from the handle; the cutting portion forming a toothed longitudinal edge and a longitudinal back edge situated opposite the toothed edge; a line of cutting teeth disposed substantially entirely along the toothed edge; the cutting portion including opposite side surfaces extending between the back edge and the toothed edge and forming side surfaces of the teeth; a distance between the back edge and the toothed edge defining a height of the blade; the teeth having rake faces ground therein in a first of the side surfaces and intersecting a second side surface to form front and rear cutting edges on each tooth; the first and second side surfaces of the blade being concavely curved whereby a thickness of the blade defined between the side surfaces varies from adjacent the toothed edge to adjacent the back edge; a narrowest thickness of the blade defining a waist of the blade; the waist disposed closer to the toothed edge than to the back edge in a maximum-height region of the blade.

2. The pruning saw according to claim 1 wherein the blade height varies along a longitudinal length of the blade, the maximum-height region situated adjacent a rear end of the cutting portion.

3. The pruning saw according to claim 2 wherein the rake faces of alternating ones of the teeth are disposed on opposite ones of the side surfaces.

4. The pruning saw according to claim 3 wherein each tooth contains front and rear rake faces forming the front and rear cutting edges, respectively, the front and rear rake faces being angled relative to one another and intersecting one another to form a ridge line extending to a point where the front and rear cutting edges meet, to define a sharply pointed tooth tip at that point.

5. The pruning saw according to claim 1 wherein a distance from the back edge to the waist is at least 1.3 times a distance between the line of teeth and the waist at the maximum-height region.

6. The pruning saw according to claim 5 wherein a front end of the back edge curves toward the toothed edge to form a convexly rounded corner.

7. The pruning saw according to claim 6 wherein the blade includes a front edge extending from the rounded corner to the line of teeth and forming a front edge of a forwardmost one of the teeth.

8. The pruning saw according to claim 1 wherein a front end of the back edge curves toward the toothed edge to form a convexly rounded corner.

9. The pruning saw according to claim 8 wherein the blade includes a front edge extending from the rounded corner to the line of teeth and forming a front edge of a forwardmost one of the teeth.

10. The pruning saw according to claim 1 wherein the rear cutting edge of each tooth forms an angle of attack of 8–14° relative to a reference plane oriented normal to the line of teeth, and the front cutting edge of each tooth forms an angle of attack of 33–43° relative to that reference plane.

11. The pruning saw according to claim 1 wherein the teeth are equidistantly spaced and of identical shape.

* * * * *